March 27, 1956 J. K. GAYLORD ET AL 2,740,009
SWITCH FOR ANTI-CREEP DEVICE
Filed June 14, 1952
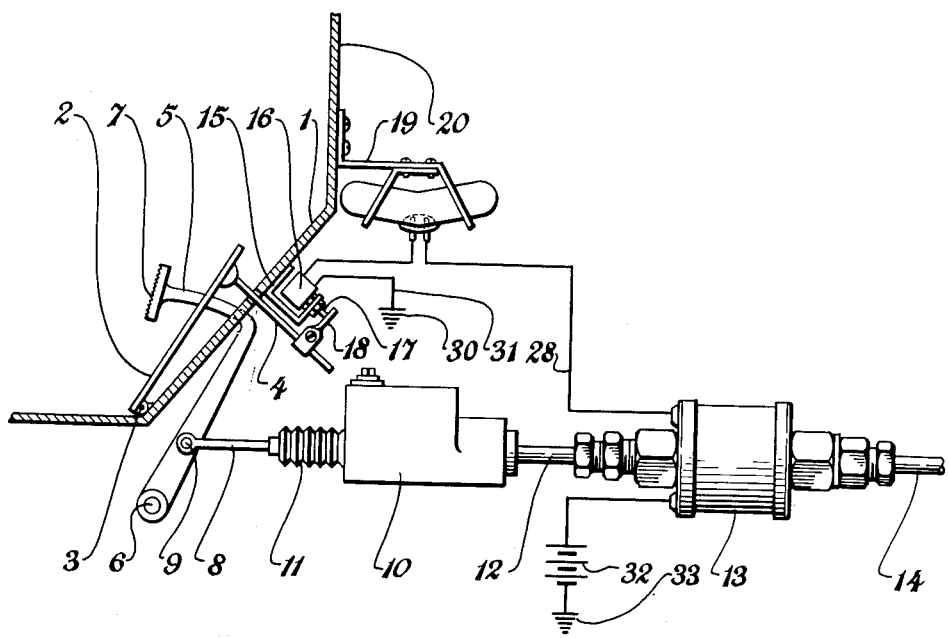
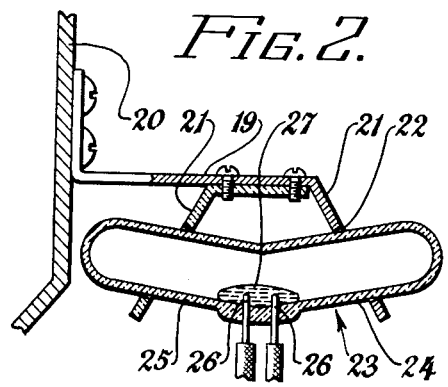
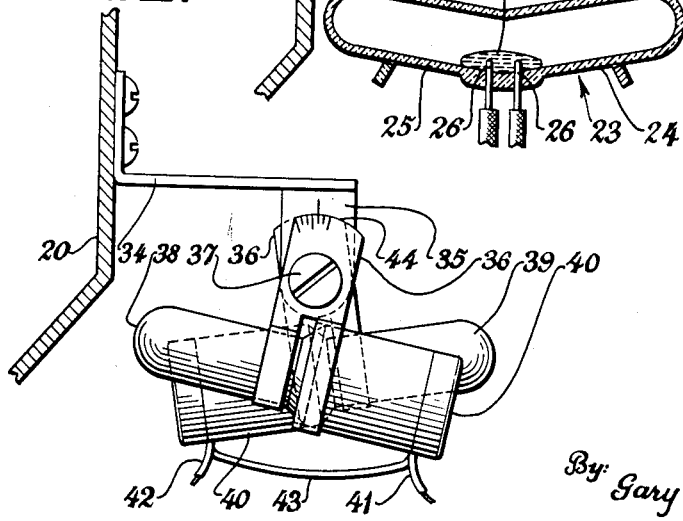
Inventors:
James K. Gaylord
Raymond J. Carter
Paul T. Hahn
By: Gary, Desmond & Parker
Attys.

United States Patent Office 2,740,009
Patented Mar. 27, 1956

2,740,009
SWITCH FOR ANTI-CREEP DEVICE

James K. Gaylord, Raymond J. Carter, and Paul T. Hahn, Chicago, Ill., assignors to Gaylord Products, Incorporated, Chicago, Ill., a corporation of Delaware Application June 14, 1952, Serial No. 293,707

1 Claim. (Cl. 200—61.47)

This invention relates to improvements in a device for preventing undesired motion of an automotive vehicle and refers particularly to a device of this character which prevents undesired movement of the vehicle after the vehicle has moved to a stop from either a forward or reverse direction.

Devices have heretofore been proposed for preventing undesired motion of an automotive vehicle, that is, preventing "creeping" of the vehicle, but in most instances such undesired motion or creeping is prevented only when the vehicle has come to a stop after previous forward motion. In some instances the so-called anti-creep devices of the prior art not only do not prevent creeping after coming to a stop from reverse directions, but under some conditions of reverse driving the anti-creep device comes into play and locks the brakes when the operator has no desire or intention of coming to a complete stop.

The present invention contemplates an inertia switch or series of inertia switches so devised as to permit securing the advantages of an anti-creep device after having stopped from travel in either direction.

Another feature of the invention resides in an inertia switch or series of inertia switches so devised and so associated with other elements of an anticreep device that the anti-creep mechanism for preventing creeping after stopping from forward direction is rendered functionally inoperative when stopping from previous rearward travel and vice-versa.

Other objects and advantages of the present invention will be apparent from the accompanying drawing and following detailed description.

In the drawings,

Fig. 1 is a diagrammatic view illustrating the improved anti-creep device of the present invention.

Fig. 2 is a detailed sectional view of the "two-way" mercury inertia switch employed in the anti-creep device.

Fig. 3 is a modification of the inertia switch means wherein two "one-way" mercury inertia switches are connected in series.

Referring in detail to the drawing, 1 indicates the floor board of an automotive vehicle having pivotally mounted thereon an accelerator pedal 2 which is pivoted as at 3 in Fig. 1. The pedal 2 is connected to a rod 4 which is adapted to manipulate the throttle (not shown) of the vehicle. A service brake arm 5 pivoted as at 6 to a portion of the vehicle protrudes through the floor board 1 and carries at its end a pedal 7 whereby the brake arm 5 may be rocked about the pivot point 6 by the operator in applying the service brakes.

A rod 8 is pivotally connected to the arm 5, as at 9 in Fig. 1, said rod extending into a master brake cylinder 10 whereby the piston within the cylinder may be manipulated to establish fluid pressure in the brake lines. The master brake cylinder 10 is of conventional construction and carries a flexible seal for keeping dirt and dust out of the cylinder.

A pipe 12 is connected to the discharge end of the master brake cylinder 10, said pipe having interposed therein a solenoid operated valve 13. A continuation 14 of the pipe 12 connects into the discharge end of the valve 13 and, in turn, connects with the conventional brake operating cylinders of the automotive vehicle.

A bracket 15 is mounted upon the rear face of floor board 1 and carries an electric switch 16. The switch 16 is of the normally open type and has an operating plunger 17 disposed adjacent a lug 18 secured to the accelerator linkage 4. The arrangement is such that when the plunger 17 is not depressed, the switch 16 will be open but when the plunger 17 is depressed by the accelerator linkage rod 4 returning to inoperative position, the switch 16 will be closed.

A bracket 19 is also mounted upon the inner face of fire board 20, said bracket having two downwardly extending diverging arms 21. The arms 21 are provided with apertures 22 and are adapted to support a tubular mercury switch 23. The mercury switch 23 is formed essentially in two sections, 24 and 25 respectively, the sections being joined together with their longitudinal axes disposed at an angle to each other. At the lower portion of the switch 23 a pair of electrodes 26 extend into the interior of the tubular member, said electrodes positioned adjacent the plane of juncture of the two sections 24 and 25. A body of mercury 27 is positioned within the switch 24 and normally functions to connect the two electrodes 26 together.

The solenoid of the solenoid operated switch 13, the switch 16 and the mercury switch 23 are connected in series with each other by means of conductors 28 and 29. One side of the switch 16 is connected to ground 30 by means of conductor 31 and one side of the solenoid of the solenoid operated switch 13 is connected to a battery 32, the opposite side of the battery being connected to ground 33. The arrangement is such that when switch 16 and switch 23 are closed, the solenoid which operates the valve 13 is energized. Energization of the solenoid closes the valve 13 and prevents communication between pipes 12 and 14. When either or both of the switches 16 and 23 are open, the solenoid is deenergized and free communication exists between pipes 12 and 14.

The valve 13 is of conventional construction and is described in detail in our copending application Serial No. 293,708 filed June 14, 1952. The construction of the valve is such that the passage of fluid can always take place from the pipe 12 to the pipe 14 when the pressure of the fluid in the pipe 12 exceeds the pressure of the fluid in the pipe 14. When the valve is open, that is when the solenoid is deenergized, although fluid may pass from the pipe 12 to the pipe 14 when the differential in pressure hereinbefore described exists, the closing of the valve will prevent fluid from passing from the pipe 14 to the pipe 12 even though the pressure in the pipe 14 exceeds the pressure in the pipe 12. Hence, closing of the valve 13 only prevents reverse flow of fluid from pipe 14 to pipe 12.

In the operation of the system illustrated in Fig. 1, with the vehicle moving at a uniform velocity, switch 23 will be closed since on inertia force acts upon the mercury 27 and hence, it remains in its normal position bridging electrodes 26.

However, with uniform velocity of the vehicle, the accelerator pedal will be depressed and, hence, switch 16 will be in its normal open position. Accordingly, in these circumstances, the solenoid will be deenergized and free communication will exist between pipes 12 and 14 in either direction.

If the operator releases the accelerator pedal one of two things may happen depending upon the rate of deceleration of the vehicle. If the deceleration is low, the mercury 27 may not move from its bridging position with respect to electrodes 26 and, hence, switch 23 will remain closed. If the deceleration is high, the mercury may move forwardly into section 24 of the switch 23 thereby breaking connection between the electrodes 26 for the period of such high deceleration. In all events, switch 16 will be closed by the release of the accelerator pedal and the solenoid of valve 13 may or may not be energized depending upon the position of mercury 27. However, whether valve 13 is closed by energization of the solenoid or open by the deenergization of the solenoid, it makes no difference in the operation of the vehicle since the brake pedal 7 has not been depressed and hence no braking pressure will have been established in pipe 14.

Accordingly, in the two situations mentioned hereinbefore, the present invention is inoperative and the vehicle can be manipulated and operated in the normal manner as though the invention were not attached thereto, that is, the invention will not interfere with the normal operation of the vehicle. To exemplify the use of the invention, further operating conditions met with in driving practice will be described.

Assume that while the vehicle is moving at a uniform velocity, it is desired to bring the vehicle to a stop by the use of the service brake. Switch 16 will initially be open and switch 23 will be closed during uniform velocity travel. When the brake is applied, the accelerator pedal will be released and the operator will depress the brake pedal 7. Release of the accelerator pedal causes switch 16 to close and therefore at the instant of release of the accelerator pedal the solenoid will be energized. When the brake pedal is depressed the pressure of the fluid in pipe 12 will exceed the pressure of the fluid in pipe 14 and although the solenoid in the valve 13 is energized fluid will pass from the pipe 12 to the pipe 14 and, hence, under the influence of the brakes, the vehicle will decelerate at a relatively high rate. Deceleration of the vehicle, at said high rate will cause the mercury 27 to move forwardly into section 24 of the mercury switch 23 and hence during said deceleration period the solenoid circuit will be open by means of the switch 23. As the vehicle comes to a stop, however, the rate of deceleration diminishes and hence at substantially the time the vehicle comes to rest the mercury 27 will have moved backwardly in the section 24 to substantially its normal position bridging electrodes 26. When the mercury has thus moved to its bridging position the solenoid will again be energized and at this period of time since the agency stopping the vehicle has been the fluid pressure in the pipe 14, the closing of the valve 13 will substantially lock the high pressure fluid in pipe 14, that is in the braking cylinders of the vehicle. In this fashion, the brakes of the vehicle will be locked with both switches 16 and 23 closed. It can readily be seen that unintended motion of the vehicle, such as creeping or movement down an incline will be prevented.

A further condition met with in normal operation of the vehicle resides in the situation which exists when the vehicle is moving and it is desired to slow the vehicle but not bring the vehicle to a complete stop. The present invention remains substantially inoperative under these circumstances, that is, in this normal operation of the vehicle the invention will not interfere. Assume, for instance, that the vehicle is moving and it is desired to slow down the vehicle without stopping the same. If the accelerator pedal has been depressed the first act of the operator will be to release the accelerator pedal and the next operation will be to apply pressure to the brake pedal. Releasing of the accelerator pedal will close switch 16 and if the vehicle had been moving at a uniform velocity switch 23 will also be closed in which case the solenoid in valve 13 will be energized. However, at the instant of merely releasing the accelerator pedal no brake pressure will exist in the fluid in pipe 14 and hence the invention will not be brought into operation. When, however, the brake pedal is depressed, the vehicle will be decelerated and hence switch 23 will be opened as hereinbefore described and hence during the decelerating period the invention will not be brought into operation. After slowing the movement of the car, without bringing the invention into its active operation, it may be desired to again speed up the movement of the car. To accomplish this the accelerator pedal must be depressed and hence switch 16 will be opened and the solenoid will not be energized regardless of the position of the mercury in switch 27. Accordingly it can readily be seen that except when the vehicle is stopped by the application of brake pressure the invention will not be brought into active use and will not interfere with normal driving operations. On the other hand when the vehicle is stopped the invention comes into active operation and prevents unintended and undesired movement of the vehicle.

As an important feature of the present invention, it will be noted that the mercury switch 23 comprises two sections 24 and 25 and, hence, those operations hereinbefore described when the vehicle moves in a forward direction or is brought to a stop from previous movement in a forward direction will be duplicated when the vehicle moves rearwardly or is brought to a stop after previous rearward movement. Hence, when the vehicle is brought to a stop by the application of the brake after previous rearward movement, the solenoid in valve 13 will be energized to confine fluid under pressure in the pipe 14, that is, in the braking cylinders, and, therefore, undesired or unintended motion of the vehicle, such as, creeping or the like will be prevented.

The fact that the mercury 27 is potentially free to move in either direction from the electrodes 26, that is, into section 24 or section 25, plays no part in the effective operation of the vehicle, since on forward movement of the vehicle the only time that the mercury will move into section 25 is when the vehicle accelerates and at this period since switch 16 will be open the fact that rearward movement of the mercury into section 25 takes place is immaterial to the functioning of the system. The same applies to movement into section 24 on rearward movement of the vehicle, that is, this movement only takes place on rearward acceleration and at such period the switch 23 is functionless.

Referring particularly to Fig. 3, a bracket 34 may be positioned upon the inner face of the fireboard 20 and may carry a downwardly extending lug 35. A pair of straps 36 may be adjustably carried upon lug 35 by means of screw 37. The straps 36 may respectively embrace mercury switches 38 and 39, said switches being of conventional construction, that is, each having a globule of mercury which is adapted to normally bridge electrodes carried at the rear ends 40 of the switches when the switches are in the position illustrated. A conductor 41 connects with one electrode in switch 38 and conductor 42 connects with one electrode of switch 39. The remaining electrodes of the switches are connected together by jumper 43, that is, the switches are connected in series. In the operation of the switches, conductors 41 and 42 may connect the switches 38 and 39 in series with switch 16 and the solenoid of valve 13, the switches 38 and 39 together functioning in the manner described in conjunction with mercury switch 23.

In so far as forward direction of the vehicle is concerned switch 39 functions the same as the mercury operating in section 24 of switch 23, except that, when the vehicle accelerates forwardly the switch 39 remains closed, but since forward acceleration requires that pedal 2 be depressed, switch 16 will be open and, hence, switch 39 open or closed is functionless. The same applies to switch 38 in rearward movement of the vehicle, that is, it operates in the fashion of the operation of the mercury in section 25 of switch 23, except during rearward acceleration, at which time switch 38, open or closed, is functionless.

It will be noted that the sections 24 and 25 of switch 23 and switches 38 and 39 have their respective center lines inclined to the horizontal. These angles determine the criticalness of operation of the switches. For instance, if the angle made with the horizontal of section 24 is relatively great, the mercury 27 will not break contact with the electrodes 26 unless rapid deceleration takes place and, hence, if said angle is too great, solenoid valve 31 may act to confine braking pressure in line 14 when it is desired only to slow down the vehicle and not come to a substantial stop. On the other hand, if the angle is too small the operation of the switch 23 becomes too critical for use unless only substantially level surfaces are traversed by the vehicle. If inclinations are encountered by the vehicle with too small an angle of inclination of the sections, the mercury may tend to move forwardly under the influence of gravity rather than under the influence of inertia, that is, the gravity factor of the switch may be too pronounced. Of course, the same considerations apply to the switches 38 and 39.

In copending application for patent, Serial No. 293,708, filed June 14, 1952, hereinbefore mentioned, a means is contemplated for compensating for the gravity factor of the inertia switch. In that case the switch may be mounted upon a gravity actuated pendulum. Broadly, the present invention contemplates mounting switch 23 or switches 38 and 39 upon such a pendulum support, or upon a fixed support as illustrated in the accompanying drawings. Of course, if a fixed support is employed, a switch 23 having desirable angular relationship of the sections 24 and 25 will be selected for a predetermined average terrain upon which the vehicle is to be driven. In the form of the invention shown in Fig. 3, calibrations 44 may be carried upon the ends of straps 36 whereby, the inclination angles of the switches 38 and 39 may be readily selected.

We claim as our invention:

An inertia operated switch comprising an elongated tubular member having two substantially oppositely extending sections adapted to be carried upon a moving body with the longitudinal axes of said sections disposed substantially parallel to the direction of movement of said body, the longitudinal axis of each section being a straight line and said axes intersecting at an intermediate portion of the switch, a pair of electrical connections carried by said switch adjacent the intersection of said axes, a liquid positioned in said tubular member consisting solely of mercury, said mercury being adapted for electrically bridging said connections, said mercury being free to move into said sections under the influence of inertia force substantially parallel to the axes of said sections to break the circuit between said connections when said body changes its velocity.

References Cited in the file of this patent

UNITED STATES PATENTS

| Number | Name | Date |
|---|---|---|
| Re. 20,733 | Barrett et al. | May 24, 1938 |
| 2,100,105 | Lee et al. | Nov. 23, 1937 |
| 2,235,112 | Pulaski | Mar. 18, 1941 |
| 2,287,562 | Pennington | June 23, 1942 |
| 2,400,278 | Wisely | May 14, 1946 |
| 2,542,211 | Sauri | Feb. 20, 1951 |
| 2,572,962 | Weiss et al. | Oct. 30, 1951 |
| 2,650,274 | McCammant | Aug. 25, 1953 |